(12) United States Patent
Huang et al.

(10) Patent No.: US 9,726,147 B2
(45) Date of Patent: Aug. 8, 2017

(54) SYSTEM AND METHOD FOR STOPPING THE OPERATION OF WIND TURBINE

(75) Inventors: Xiongzhe Huang, Shanghai (CN); Danian Zheng, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 327 days.

(21) Appl. No.: 14/381,687

(22) PCT Filed: May 2, 2012

(86) PCT No.: PCT/CN2012/074975
§ 371 (c)(1),
(2), (4) Date: Nov. 11, 2014

(87) PCT Pub. No.: WO2013/163795
PCT Pub. Date: Nov. 7, 2013

(65) Prior Publication Data
US 2015/0110596 A1 Apr. 23, 2015

(51) Int. Cl.
*F03D 7/04* (2006.01)
*F03D 7/02* (2006.01)
*F03D 17/00* (2016.01)

(52) U.S. Cl.
CPC ......... *F03D 7/0264* (2013.01); *F03D 7/0224* (2013.01); *F03D 17/00* (2016.05);
(Continued)

(58) Field of Classification Search
CPC .... F03D 7/0224; F03D 7/0244; F03D 7/0264; F03D 7/045; F03D 7/024; F03D 7/0268;
(Continued)

(56) References Cited

U.S. PATENT DOCUMENTS 7,004,724 B2   2/2006  Pierce et al.
7,118,339 B2 * 10/2006  Moroz ................... F03D 1/008
                                                    415/4.3
(Continued)

FOREIGN PATENT DOCUMENTS

CN      101493075 A    7/2009
CN      201326512 Y   10/2009
(Continued)

OTHER PUBLICATIONS

European Search Report and Opinion issued in connection with corresponding EP Application No. 12875758.0 on Nov. 27, 2015.
PCT International Search Report, Jan. 21, 2013.

*Primary Examiner* — Dwayne J White
*Assistant Examiner* — Sang K Kim
(74) *Attorney, Agent, or Firm* — Dority & Manning, P.A.X.

(57) ABSTRACT

A method for stopping the operation of a wind turbine is disclosed. The method may generally include receiving signals associated with at least one operating condition of the wind turbine, analyzing the at least one operating condition with a controller of the wind turbine, implementing a first stopping procedure in order to stop operation of the wind turbine when analysis of the at least one operating condition indicates that a pitch system failure has occurred and implementing a second stopping procedure in order to stop operation of the wind turbine when analysis of the at least one operating condition indicates that a different wind turbine stop event has occurred.

17 Claims, 6 Drawing Sheets

(52) U.S. Cl.
CPC ..... *F05B 2250/73* (2013.01); *F05B 2270/107* (2013.01); *F05B 2270/309* (2013.01); *F05B 2270/331* (2013.01); *Y02E 10/723* (2013.01)

(58) Field of Classification Search
CPC .......... F05B 2260/80; F05B 2270/1011; F05B 2270/107
See application file for complete search history.

(56) References Cited

U.S. PATENT DOCUMENTS

| | | | | |
|---|---|---|---|---|
| 7,488,155 | B2* | 2/2009 | Barbu | F03D 7/0224 416/1 |
| 8,348,617 | B2 | 1/2013 | Machold | |
| 8,430,632 | B2* | 4/2013 | Haag | F03D 7/0224 415/1 |
| 2008/0290664 | A1* | 11/2008 | Kruger | F03D 7/0224 290/55 |
| 2009/0148286 | A1* | 6/2009 | Kammer | F03D 7/0224 416/31 |
| 2009/0243295 | A1* | 10/2009 | Kammer | F03D 7/0224 290/44 |
| 2010/0237617 | A1* | 9/2010 | Vyas | F03D 7/043 290/44 |
| 2011/0064573 | A1* | 3/2011 | Viripullan | F03D 7/024 416/1 |
| 2011/0142630 | A1* | 6/2011 | Hayashi | F03D 7/0224 416/34 |
| 2011/0193343 | A1* | 8/2011 | Nakashima | F03D 7/0224 290/44 |
| 2015/0086360 | A1* | 3/2015 | Hammerum | F03D 7/0224 416/1 |

FOREIGN PATENT DOCUMENTS

| | | |
|---|---|---|
| CN | 102022260 A | 4/2011 |
| EP | 2108825 A2 | 10/2009 |
| EP | 2256342 A1 | 12/2010 |
| WO | 2012025121 A2 | 3/2012 |

* cited by examiner

SYSTEM AND METHOD FOR STOPPING THE OPERATION OF WIND TURBINE

FIELD OF THE INVENTION

The present subject matter relates generally to wind turbines and, more particularly, to a system and method for stopping the operation of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of a wind turbine, each rotor blade is subject to deflection and/or twisting due to the aerodynamic wind loads acting on the blade, which results in reaction loads transmitted through the blade. To control these loads and to allow for a maximum amount of wind energy to be captured by the rotor blades, the blades are typically pitched during operation. Pitching generally involves rotating each rotor blade about its pitch axis in order to alter the orientation of the rotor blades relative to the wind, thereby adjusting the loading on each rotor blade.

In many instances, the operation of a wind turbine must be stopped due to system failures and/or other emergency events. For example, wind turbine stop events may include controller failures, pitch system failures, other component failures, grid loss, power failure, other emergency situations and/or the like. Currently, wind turbine control systems utilize a single, uniform stopping procedure in order to halt operation when a wind turbine stop event occurs. Specifically, conventional control systems are designed to pitch the rotor blades to the feather position at a single, predetermined pitch rate regardless of the wind turbine stop event. However, each stop event is typically characterized by unique design driven loads. For example, unlike other wind turbine stop events, the failure of one or two of the pitch systems of a wind turbine typically results in a substantial increase in the asymmetric or unbalanced loads acting on the wind turbine. Unfortunately, conventional stopping procedures are not capable of efficiently and effectively stopping the operation of a wind turbine when such increased asymmetric loads exist.

Accordingly, an improved system and/or method for stopping the operation of a wind turbine when a pitch system failure occurs would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for stopping the operation of a wind turbine. The method may generally include receiving signals associated with at least one operating condition of the wind turbine, analyzing the at least one operating condition with a controller of the wind turbine, implementing a first stopping procedure in order to stop operation of the wind turbine when analysis of the at least one operating condition indicates that a pitch system failure has occurred and implementing a second stopping procedure in order to stop operation of the wind turbine when analysis of the at least one operating condition indicates that a different wind turbine stop event has occurred.

In another aspect, the present subject matter is directed to a method for stopping the operation of a wind turbine. The method may generally include receiving signals associated with at least one operating condition of the wind turbine, analyzing the at least one operating condition with a controller of the wind turbine and implementing a first stopping procedure or a second stopping procedure in order to stop operation of the wind turbine, wherein the first stopping procedure is implemented when analysis of the at least one operating condition indicates that a pitch system failure has occurred.

In a further aspect, the present subject matter is directed to a system for stopping the operation of a wind turbine. The system may generally include a sensor configured to monitor at least one operating condition of the wind turbine and a controller communicatively coupled to the sensor. The controller may be configured to analyze the at least one operating condition to determine when a wind turbine stop event has occurred. In addition, the controller may be configured to implement a first stopping procedure in order to stop operation of the wind turbine when it is determined that a pitch system failure has occurred and a second stopping procedure in order to stop operation of the wind turbine when it is determined that a different wind turbine stop event has occurred.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for stopping the operation of a wind turbine. Specifically, in several embodiments, a wind turbine controller(s) may be configured to implement different stopping procedures for different wind turbine stop events (e.g., pitch system failures, controller failures, other component failures, grid loss, power failure, communications breakdowns and/or other emergency situations). For example, in one embodiment, the controller(s) may be configured to implement a first stopping procedure when a pitch system failure is detected and a second stopping procedure when another wind turbine stop event is detected. By implementing a unique stopping procedure for pitch system failures, the stopping procedure may be specifically tailored to handle the increased asymmetric or unbalanced loads that typically result from the inability to pitch one or more of the rotor blades.

It should be appreciated that, as used herein, a "pitch system failure" occurs when a rotor blade is no longer capable of being automatically rotated about its pitch axis. Thus, pitch system failures may result from the failure of any of the pitch system components (e.g., the failure of a pitch adjustment mechanism and/or a pitch controller), from a communication breakdown (e.g., between a pitch adjustment mechanism and a pitch controller) and/or from any other failures/events that may take away the ability of a wind turbine to automatically pitch one of its rotor blades.

It should also be appreciated that the present subject matter will generally be described herein with reference to wind turbines having three rotor blades. Thus, the disclosed stopping procedures for pitch system failures may be utilized when the pitch system for one/two of the rotor blades has failed, thereby leaving two/one rotor blades that may be pitched to the feather position in order to stop the wind turbine. However, it should be appreciated that the present subject matter may also be utilized with wind turbines having less than three rotor blades or greater than three rotor blades. In such an embodiment, the disclosed stopping procedures may generally be utilized when the pitch system for at least one of the rotor blades remains operational.

Figure 1:
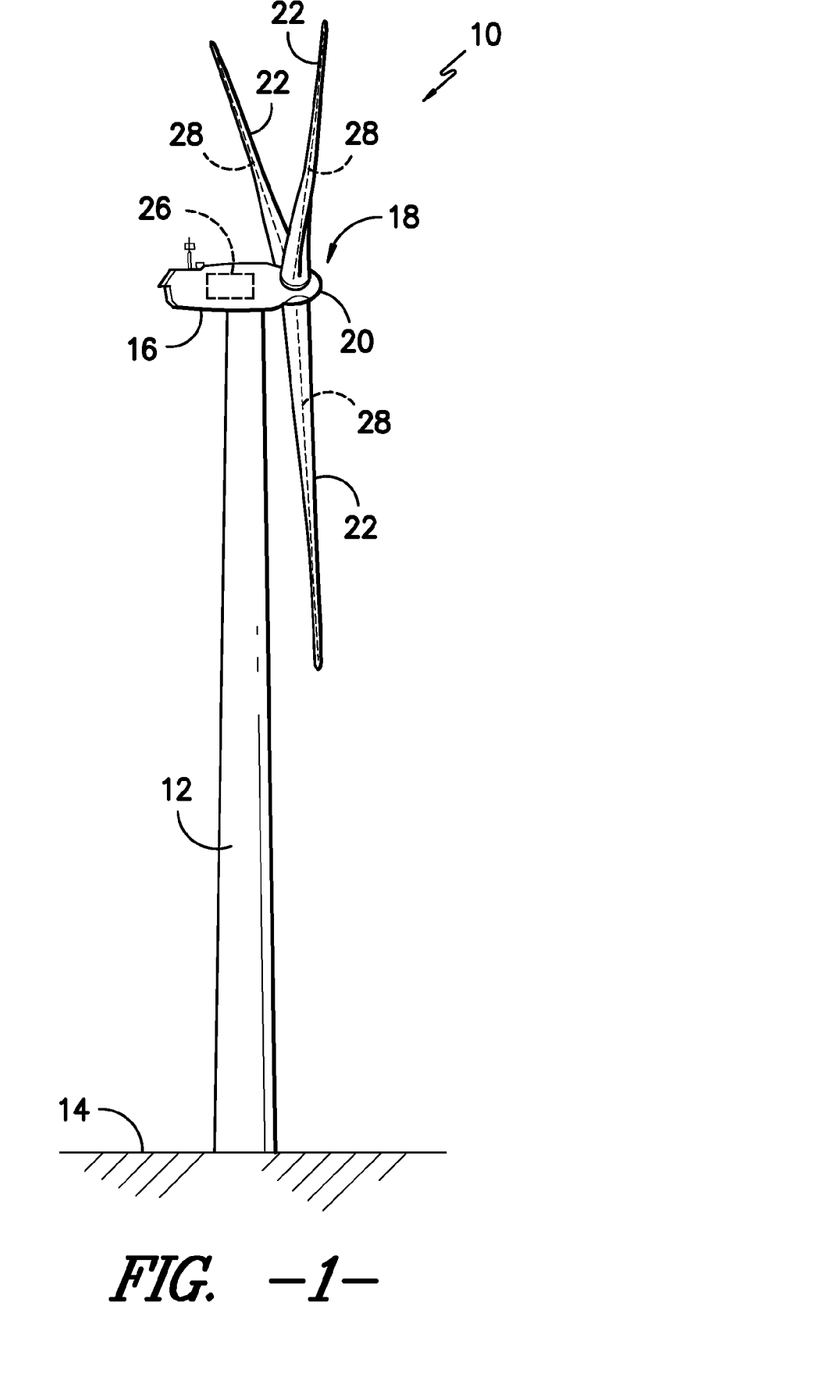
FIG. 1 illustrates a perspective view of one embodiment of a wind turbine.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or main controller 26 centralized within the nacelle 16. In general, the main controller 26 may comprise a computer or other suitable processing unit. Thus, in several embodiments, the main controller 26 may include suitable computer-readable instructions that, when implemented, configure the controller 26 to perform various different functions, such as receiving, transmitting and/or executing wind turbine control signals (e.g., pitch commands). As such, the main controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 as well as the loads acting on the rotor blade 22. For example, the main controller 26 may individually control the pitch angle of each rotor blade 22 by transmitting suitable pitch commands to a pitch system 30 (FIG. 2) of the rotor blade 22. During operation of the wind turbine 10, the controller 26 may generally transmit pitch commands to each pitch system 30 in order to alter the pitch angle of each rotor blade 22 between 0 degrees (i.e., a power position of the rotor blade 22) and 90 degrees (i.e., a feathered position of the rotor blade 22).

Figure 2:
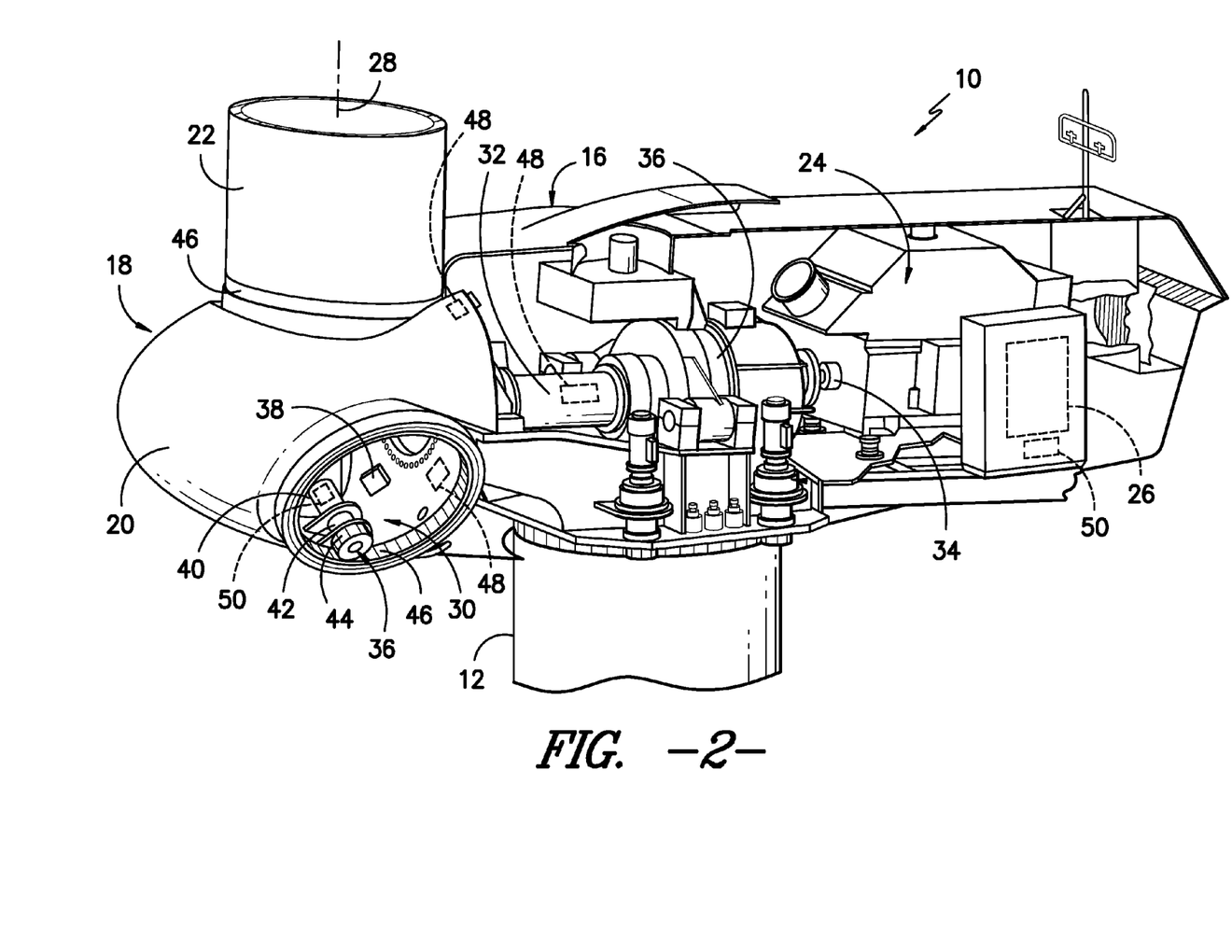
FIG. 2 illustrates a simplified, internal view of one embodiment of a nacelle of a wind turbine.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

Additionally, the main controller 26 may also be located within the nacelle 16. As is generally understood, the main controller 26 may be communicatively coupled to any number of the components of the wind turbine 10 in order to control the operation of such components. For example, as indicated above, the main controller 26 may be communicatively coupled to each pitch system 30 of the wind turbine 10 (one of which is shown) to facilitate rotation of each rotor blade 22 about its pitch axis 28.

As shown in FIG. 2, each pitch system 30 may include a pitch adjustment mechanism 36 and a pitch controller 38 communicably coupled to the pitch adjustment mechanism

36. In general, each pitch adjustment mechanism 36 may include any suitable components and may have any suitable configuration that allows the pitch adjustment mechanism 36 to function as described herein. For example, in several embodiments, each pitch adjustment mechanism 36 may include a pitch drive motor 40 (e.g., any suitable electric motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28.

In alternative embodiments, it should be appreciated that each pitch adjustment mechanism 36 may have any other suitable configuration that facilitates rotation of a rotor blade 22 about its pitch axis 28. For instance, pitch adjustment mechanisms 36 are known that include a hydraulic or pneumatic driven device (e.g., a hydraulic or pneumatic cylinder) configured to transmit rotational energy to the pitch bearing 46, thereby causing the rotor blade 22 to rotate about its pitch axis 28. Thus, in several embodiments, instead of the electric pitch drive motor 40 described above, each pitch adjustment mechanism 36 may include a hydraulic or pneumatic driven device that utilizes fluid pressure to apply torque to the pitch bearing 46.

The operation of the pitch adjustment mechanism 36 for each rotor blade 22 may generally be controlled by the main controller 26 via the individual pitch controller 38 for that rotor blade 22. Thus, in several embodiments, the main controller 26 and each pitch controller 38 may be in communication with one another and/or the pitch adjustment mechanism 36 via a wired connection, such as by using a suitable communicative cable. In other embodiments, the main controller 26 and each pitch controller 38 may be in communication with one another and/or the pitch adjustment mechanism 36 via a wireless connection, such as by using any suitable wireless communications protocol known in the art.

It should be appreciated that, although the main controller 26 may generally be utilized to control the pitch adjustment mechanisms 36 via the pitch controllers 38, each pitch controller 38 may also be configured to independently control the operation of its respective pitch adjustment mechanism 36. For example, when a communication failure occurs between the main controller 26 and one or more of the pitch controllers 38 (e.g., due to power loss, controller failure, communication breakdown and/or the like), the pitch controllers 38 may be configured to implement the stopping procedures described herein in order to stop the operation of the wind turbine 10.

Referring still to FIG. 2, the wind turbine 10 may also include a plurality of sensors 48, 50 for monitoring one or more operating conditions of the wind turbine 10. As used herein, an operating condition of the wind turbine 10 is "monitored" when a sensor 48, 50 is used to determine its present value. Thus, the term "monitor" and variations thereof are used to indicate that the sensors 48, 50 need not provide a direct measurement of the operating condition being monitored. For example, the sensors 48, 50 may be used to generate signals relating to the operating condition being monitored, which can then be utilized by the main controller 26 or other suitable device to determine the actual operating condition.

In several embodiments of the present subject matter, the wind turbine 10 may include one or more asymmetric load sensors 48 configured to monitor the amount of asymmetric loading on the wind turbine 10. Specifically, in one embodiment, the asymmetric load sensor(s) 48 may comprise one or more strain gauges configured to monitor asymmetric loads by detecting the bending moments caused by such loads. For example, as shown in FIG. 2, a strain gauge may be mounted on or within the main rotor shaft 32 in order to detect loads/moments transmitted through the rotor shaft 32 as a result of asymmetric loads on the wind turbine 10. Alternatively, one or more strain gauges may be mounted on or within various other components of the wind turbine 10 (e.g., the rotor blades 22, the hub 20, the tower 12 and/or the like) in order to monitor the asymmetric loading of the wind turbine 10. In another embodiment, the asymmetric load sensor(s) 48 may comprise one or more position sensors (e.g., proximity sensors) configured to monitor asymmetric loading by detecting changes in the relative positions of wind turbine components. For instance, as shown in FIG. 2, one or more position sensors may be disposed at or adjacent to the interface between the hub 20 and the nacelle 16 in order to detect changes in the position of the hub 20 relative to the nacelle 16 (e.g., by configuring the sensor(s) to monitor the distance between the back flange of the hub 20 and the front end of the bearing seat of the nacelle 16). Of course, it should be appreciated that, in alternative embodiments, the asymmetric load sensor(s) 48 may comprise any other suitable sensors that allow the asymmetric loading of the wind turbine 10 to be monitored.

In addition to the asymmetric load sensor(s) 48 described above, the wind turbine 10 may also include additional sensors for monitoring various other operating conditions of the wind turbine 10. For instance, the wind turbine 10 may include one or more sensors 50 configured to monitor the operation of the pitch adjustment mechanisms 36 (e.g., by monitoring the current input to and/or the torque output of each pitch adjustment mechanism 36). In addition, the wind turbine 10 may include one or more sensors 50 configured to monitor the operation of the main controller 26 and/or the pitch controllers 38, such as by monitoring the power to and commands transmitted from such controller(s) 26, 38. Further, the wind turbine 10 may also include various other sensors for monitoring any other suitable operating conditions of the wind turbine 10, such as the pitch angle of each rotor blade 22, the speed of the rotor 18 and/or the rotor shaft 32, the speed of the generator 24 and/or the generator shaft 34, the torque on the rotor shaft 32 and/or the generator shaft 34, the wind speed and/or wind direction, grid conditions, power input to the components of the wind turbine 10 and/or any other suitable operating conditions.

Figure 3:
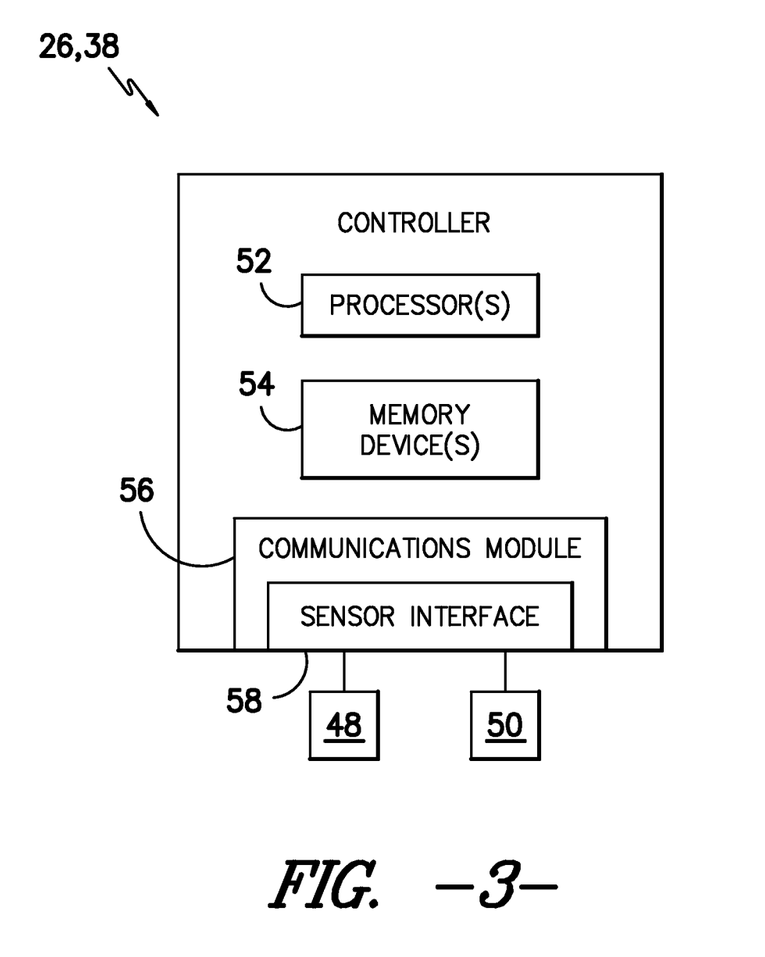
FIG. 3 illustrates a schematic diagram of one embodiment of suitable components that may be included within a controller of a wind turbine.

Referring now to FIG. 3, there is illustrated a block diagram of one embodiment of suitable components that may be included within the main controller 26 and/or the pitch controllers 38 in accordance with aspects of the present subject matter. As shown, the controller(s) 26, 38 may include one or more processor(s) 52 and associated memory device(s) 54 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 54 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 54 may generally be configured to store suitable computer-readable instructions that, when implemented by the processor(s) 52, configure the controller(s) 26, 38 to perform various functions including, but not limited to, transmitting suitable control signals to one or more of the pitch adjustment mechanisms 36, monitoring various operating conditions of the wind turbine 10, implementing the disclosed stopping procedures and various other suitable computer-implemented functions.

Additionally, the controller(s) 26, 38 may also include a communications module 56 to facilitate communications between the controller 26, 38 and the various components of the wind turbine 10. For instance, the communications module 56 may serve as an interface to permit the main controller 26 and/or the pitch controllers 38 to transmit pitch commands to each pitch adjustment mechanism 36 for controlling the pitch angle of the rotor blades 22. Moreover, the communications module 56 may include a sensor interface 58 (e.g., one or more analog-to-digital converters) to permit signals transmitted from the sensors 48, 50 of the wind turbine 10 to be converted into signals that can be understood and processed by the processors 53.

Figure 4:
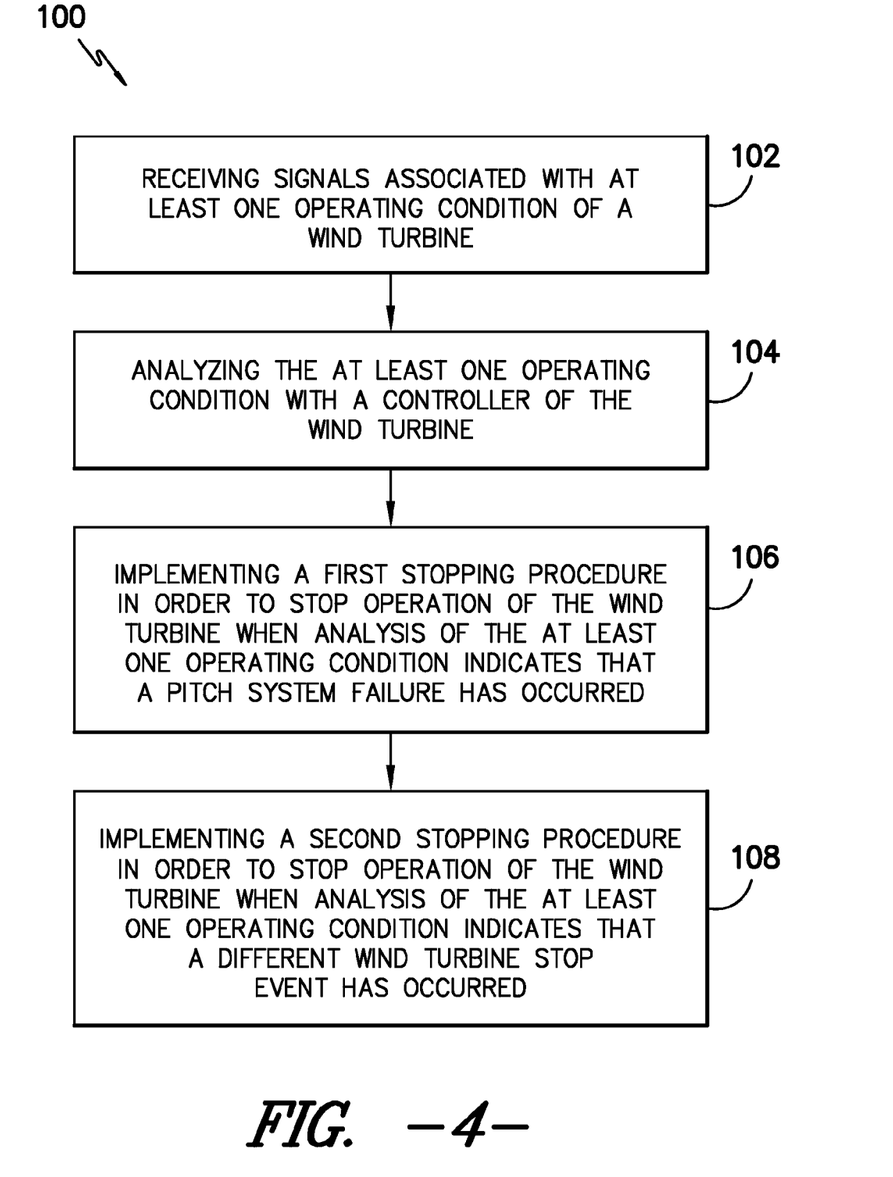
FIG. 4 illustrates a flow diagram of one embodiment of a method for stopping a wind turbine.

Referring now to FIG. 4, a flow diagram of one embodiment of a method 100 for stopping the operation of a wind turbine 10 is illustrated in accordance with aspects of the present subject matter. As shown, the method 100 generally includes receiving signals associated with at least one operating condition of a wind turbine 102, analyzing the at least one operating condition with a controller of the wind turbine 104, implementing a first stopping procedure in order to stop operation of the wind turbine when analysis of the at least one operating condition indicates that a pitch system failure has occurred 106 and implementing a second stopping procedure in order to stop operation of the wind turbine when analysis of the at least one operating condition indicates that a different wind turbine stop event has occurred 108.

In general, the disclosed method 100 may allow for the operation of a wind turbine 10 to be stopped in a more efficient and effective manner than through the use of a single, uniform stopping procedure. Specifically, different stopping procedures may be utilized for different wind turbine stop events, thereby allowing the stopping procedures to be tailored for the specific loads, structural vibrations and/or system dynamics that may occur as a result of each stop event. For example, in the illustrated embodiment, a wind turbine controller(s) 26, 38 may be configured to implement a first stopping procedure when a pitch system failure has occurred and a second stopping procedure when a different wind turbine stop event has occurred. As such, the first stopping procedure may be specifically tailored to accommodate the increased asymmetric loading that results from a pitch system failure, thereby ensuring that the wind turbine 10 is stopped in an efficient and effective manner.

As shown in FIG. 4, in 102, a signal is received that is associated with at least one operating condition of the wind turbine 10. As described above, the wind turbine 10 may include sensors 48, 50 configured to monitor various operating conditions of the wind turbine 10. Thus, signals associated with such operating conditions may be transmitted from the sensors 48, 50 to the main controller 26 and/or the pitch controllers 38. For example, the controller(s) 26, 38 may be configured to receive signals from the asymmetric load sensors 48 associated with the asymmetric loading of the wind turbine 10. In addition, the controller(s) 26, 28 may be configured to receive signals associated with other operating conditions that relate to different wind turbine stop events. For example, inputs received from sensors may allow the controller(s) 26, 38 to determine that a controller failure, other component failure, grid loss, power failure, communications breakdowns and/or other emergency event has occurred.

Additionally, as shown in FIG. 4, in 104, the operating condition(s) of the wind turbine 10 may be analyzed by the controller(s) 26, 38 to determine whether a wind turbine stop event has occurred. For example, in order to determine whether a pitch system failure has occurred, the controller(s) 26, 38 may be configured to compare the actual asymmetric loading of the wind turbine 10 (obtained via the sensors 48) to a predetermined asymmetric loading threshold. If the actual asymmetric loading is equal to or exceeds the predetermined asymmetric loading threshold, the controller(s) 26, 38 may determine that the pitch system 30 for one or more of the rotor blades 22 has failed. Alternatively, the controller(s) 26, 38 may be configured to analyze sensor inputs related to the operation of the pitch adjustment mechanisms 36 (e.g., via sensors 50) and/or any other suitable components of the wind turbine 10 in order to determine whether a pitch system failure has occurred.

It should be appreciated that the predetermined asymmetric loading threshold may generally vary from wind turbine 10 to wind turbine 10 based on numerous factors including but, not limited to, the configuration of the wind turbine 10 (e.g., rotor size), the operating conditions of the wind turbine 10 and/or the like. However, it is well within the purview of one of ordinary skill in the art to determine the asymmetric loading threshold for a particular wind turbine 10 based on the configuration of the wind turbine 10 and using known data relating to the wind turbine 10 (e.g., historical data, observed data, predicted/simulated data).

Referring still to FIG. 4, in 106 and 108, the operation of the wind turbine 10 may be stopped according to a first stopping procedure when it is determined that a pitch system failure has occurred and according to a second stopping procedure when it is determined that a different wind turbine stop event has occurred. For instance, when the controller(s) 26, 38 has determined that the asymmetric loading of the wind turbine 10 is equal to or exceeds the predetermined asymmetric loading threshold, the controller(s) 26, 38 may be configured to implement the first stopping procedure. However, if the operating conditions of the wind turbine 10 indicate that a different wind turbine stop event has occurred (e.g., controller failure, other component failure, grid loss, power failure, communications breakdowns and/or other emergency event), the controller(s) 26, 38 may be configured to implement the second stopping procedure.

In general, both the first and second stopping procedures may include pitching the rotor blades 22 from the power position to the feather position in order to stop the rotation of the rotor 18. Thus, when implementing the second stopping procedure (i.e., for a non-pitch system failure stop event), all of the rotor blades 22 may be pitched to the feather position. However, when the pitch system 30 of one or two of the rotor blades 22 has failed, only the remaining blade(s) 22 may be pitched to the feather position in order to stop the operation of the wind turbine 10. Accordingly, the first stopping procedure must account for the fact that at least one of the rotor blades 22 will remain in the power position as the wind turbine 10 is being stopped.

Figure 5:
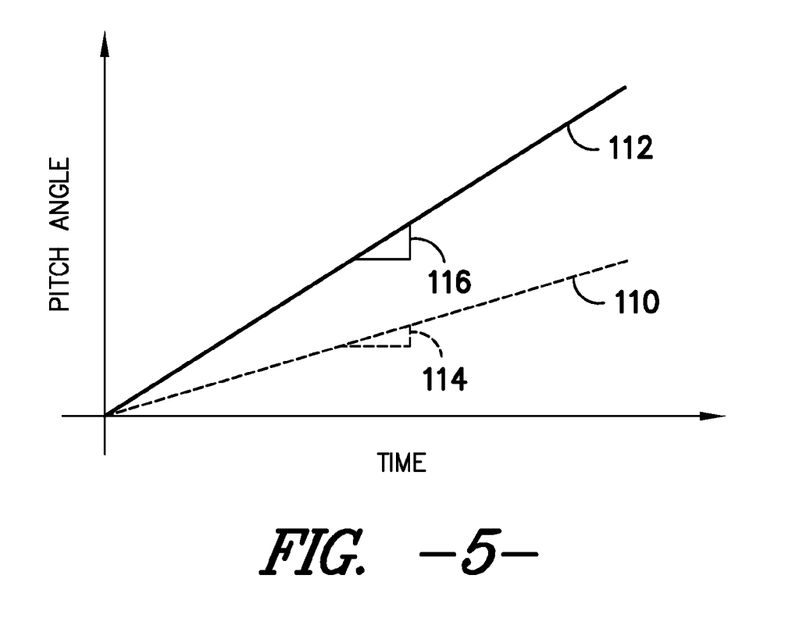
FIG. 5 illustrates one embodiment of how rotor blades may be pitched with respect to time when a pitch system failure occurs as compared to when any other wind turbine stop event occurs.

Thus, in several embodiments, the first stopping procedure may differ from the second stopping procedure with respect to the rate at which the rotor blades 22 are pitched. For example, FIG. 5 illustrates one example of how the pitch of the rotor blades 22 may be adjusted over time using the first stopping procedure (indicated by the dashed line 110) and the second stopping procedure (indicated by the solid line 112). As shown, the pitch of the rotor blades 22 may be adjusted according to a first pitch rate (indicated by the slope 114 of line 110) for the first stopping procedure 110 and according to second pitch rate (indicated by the slope 116 of line 112) for the second stopping procedure 112. In general, the first pitch rate 114 may be less or slower than the second pitch rate 116 due to the fact that less than all of the rotor blades 22 are being pitched. Specifically, when a pitch system failure occurs, abrupt changes in the pitch angles of the rotor blades 22 that have operational pitch systems 30 may result in the further increases in the asymmetric loading of the wind turbine 10 and may also result in undesirable structural vibrations and/or system dynamics. However, when a different wind turbine stop event occurs (i.e., when all of the rotor blades 22 may be pitched simultaneously), the blades 22 may be pitched at a faster rate without introducing additional asymmetric loads and/or undesirable structural vibrations and/or system dynamics.

It should be appreciated that the first and second pitch rates 114, 116 may generally correspond to any suitable rates at which the rotor blades 22 may be pitched during the first and second stopping procedures 110, 112 without introducing significant loads and/or vibrations onto the wind turbine 10. However, in one embodiment, the first pitch rate 114 may range from about 0.5 degrees/second (°/s) to about 5°/s, such as from about 1°/s to about 4°/s or from about 2°/s to about 3°/s and all other subranges therebetween. Similarly, in one embodiment, the second pitch rate 116 may range from about 5°/s to about 10°/s, such as from about 6°/s to about 9°/s or from about 7°/s to about 8°/s and all other subranges therebetween.

Figure 6:
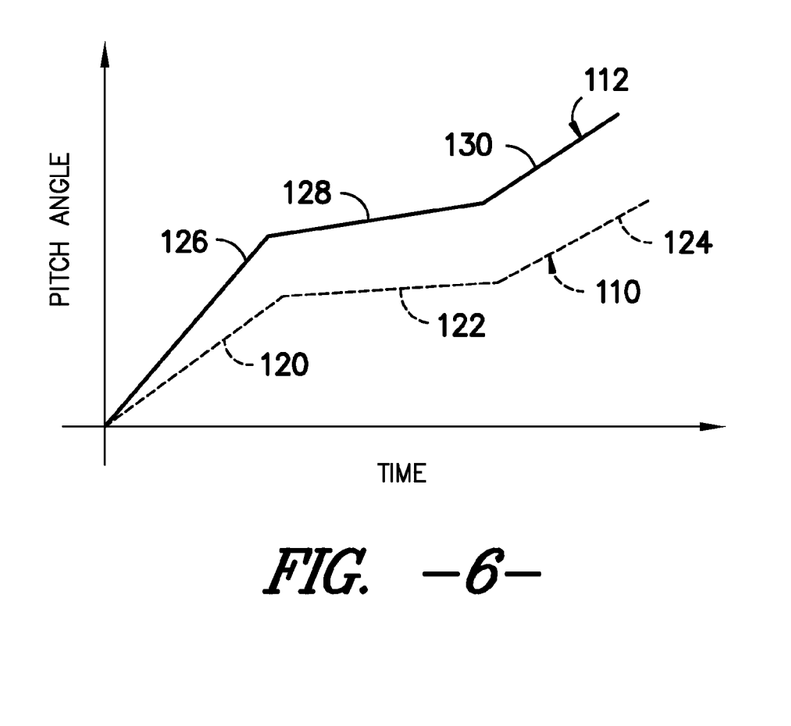
FIG. 6 illustrates another embodiment of how rotor blades may be pitched with respect to time when a pitch system failure occurs as compared to when any other wind turbine stop event occurs.

Referring now to FIG. 6, another example of how the pitch of the rotor blades 22 may be adjusted over time using the first stopping procedure (indicated by the dashed line 110) and the second stopping procedure (indicated by the solid line 112) is illustrated in accordance with aspects of the present subject matter. Unlike the embodiment described above in which the rotor blades are pitched at a constant pitch rate 114, 116 for both stopping procedures 110, 112, the first and second stopping procedures 110, 112 utilized pitch rates that vary over time, such as by adjusting the pitch rates two or more times as a wind turbine 10 is being stopped. For example, as shown in the illustrated embodiment, the first and second stopping procedures 110, 112 may be configured to adjust the pitch of the rotor blades 22 according to a triple pitch rate schedule. Specifically, when the first and stopping procedures 110, 112 are being implemented, the pitch of the rotor blades 22 may be initially adjusted at a relatively high pitch rate (indicated by line segment 120 for the first stopping procedure 110 and line segment 126 for the second stopping procedure 112), followed by adjustment of the pitch at a lower pitch rate (indicated by line segment 122 for the first stopping procedure 110 and line segment 128 for the second stopping procedure 112) and then again at a relatively high pitch rate (indicated by line segment 124 for the first stopping procedure 110 and line segment 130 for the second stopping procedure 112). The initial higher pitch rates 120, 126 may generally allow the for the rotational speed/energy of the wind turbine 10 to be substantially reduced over a short period of time. However, if such a high pitch rate 120, 126 is maintained over a long period of time, structural vibrations and/or other system dynamics may be introduced to the wind turbine 10. Thus, as shown in FIG. 6, the pitch rates may be reduced for a period of time. Once the risk of exciting structural vibrations and/or other system dynamics is minimized, the pitch rates may then be increased to quickly stop the operation of the wind turbine 10.

As shown in FIG. 6, it should be appreciated that the higher pitch rates 120, 124 for the first stopping procedure may generally be less than the higher pitch rates 126, 130 for the second stopping procedure. For example, in several embodiments, the initial pitch rate 120 for the first stopping procedure 110 may range from about 3°/s to about 7°/s, such as from about 4.5°/s to about 6.5°/s or from about 5°/s to about 6°/s and all other subranges therebetween, while the initial pitch rate 126 for the second stopping procedure 112 may range from about 5°/s to about 9°/s, such as from about 6.5°/s to about 8.5°/s or from about 7°/s to about 8°/s and all other subranges therebetween. Additionally, in several embodiments, the reduced pitch rate 122 for the first stopping procedure 110 may range from about 0.5°/s to about 5°/s, such as from about 1°/s to about 3.5°/s or from about 2°/s to about 3°/s and all other subranges therebetween, and the reduced pitch rate 128 for the second stopping procedure 112 may range from about 0.5°/s to about 5.5°/s, such as from about 1°/s to about 3.5°/s or from about 2°/s to about 3°/s and all other subranges therebetween.

It should also be appreciated that, by varying the particular pitch rates utilized in the triple pitch rate schedule, the loading on the wind turbine 10 during execution of the stopping procedures 110, 112 may be adjusted. For example, to test the affect of pitch rates on loading, three test cases were evaluated with different high pitch rates (indicated by line 120) and low pitch rates (indicated by line 122) for the first stopping procedure 110. In the first test case, a rotor blade 22 was pitched at a high pitch rate of 5.5°/s for 1.2 seconds and then at a low pitch rate of 2.5°/s for 1.9 seconds. In the second test case, the rotor blade 22 was pitched at a high pitch rate of 5.5°/s for 1.2 seconds and then at a low pitch rate of 0.5°/s for 1.9 seconds. In the third test case, the rotor blade 22 was pitched at a high pitch rate of 3.5°/s for 1.2 seconds and then at a low pitch rate of 2.5°/s for 1.9 seconds. The loading on the wind turbine 10 was then evaluated for each test case. It was found that the loads in second test case were about 8% smaller than the loads in the first test case. In addition, the loads in the third test case where about 4% smaller than the loads in the first test case.

Figure 7:
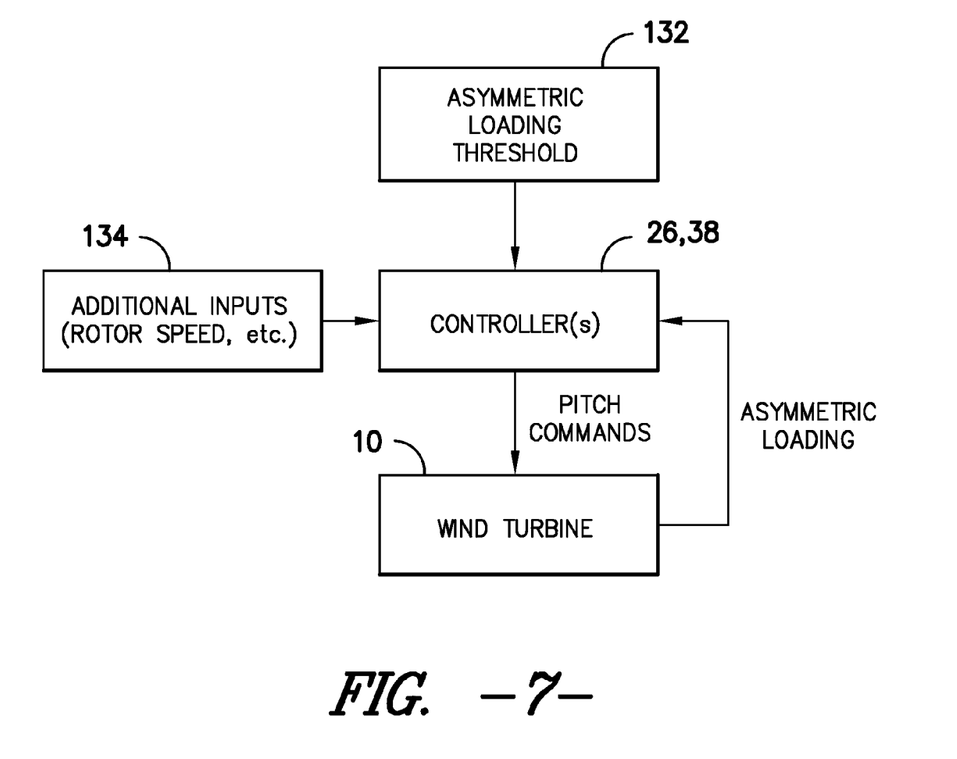
FIG. 7 illustrates a simplified, schematic diagram of a closed-loop control algorithm that may be utilized to the control pitching of the rotor blades as a wind turbine is being stopped.

Additionally, it should be appreciated that, as an alternative to the open-loop stopping procedures 110, 112 described above with reference to FIGS. 5 and 6, the disclosed stopping procedures may also be implemented using a closed-loop control system. For example, FIG. 7 illustrates a control diagram that may be utilized to implement a stopping procedure when it is determined that a pitch system failure has occurred. As shown, a closed-loop algorithm (e.g., a closed-loop PID or other suitable closed-loop control algorithm) may be utilized to continuously monitor one or more of the operating conditions of the wind turbine 10 and, based on such monitored operating conditions, make adjustments to the manner in which the rotor blade(s) 22 are pitched during the stopping procedure. Specifically, at the initiation of the stopping procedure, the controller(s) 26, 38 may be configured to initially pitch the rotor blade(s) 22 at a predetermined pitch rate (e.g., by sending suitable pitch commands to the pitch adjustment mechanisms 36). As the blades 22 are being pitched, the controller(s) 26, 38 may be configured to receive inputs associated with the asymmetric loading of the wind turbine 10 (e.g., via the asymmetric load sensor(s) 48). Thus, by continuously monitoring the asymmetric loading of the wind turbine 10, the rate at which the rotor blade(s) are pitched may be dynamically adjusted based on any variances in the loading. For example, as shown in FIG. 7, the controller(s) 26, 38 may be configured to continuously compare the monitored asymmetric loading to the predetermined asymmetric loading threshold (indicated by box 132). Thus, in the event that the monitored asymmetric loading is equal to or exceeds the asymmetric loading threshold 132, the controller(s) 26, 38 may be able to reduce the rate at which the rotor blade(s) 22 are being pitched (e.g., by transmitting suitable pitch commands to the pitch adjustment mechanism(s) 36) in order to reduce the likelihood of the loads being increased and/or structural vibrations being introduced. Similarly, in the event that the monitored asymmetric loading is less than the asymmetric loading threshold 132, the controller(s) 26, 38 may be able to increase the rate at which the rotor blades 22 are being pitched to permit the rotational speed of the rotor 18 to be reduced at a faster rate.

It should be appreciated that the controller(s) 26, 38 may also be configured to receive additional inputs (indicated by box 134) to facilitate controlling the pitch of the rotor blades 22. For example, as shown in FIG. 7, the controller(s) 26, 38 may be configured to receive inputs related to the rotor speed. In such an embodiment, the controller(s) 26, 38 may be configured to control the pitch of the rotor blades 22 based on both the rotor speed and the asymmetric loading of the wind turbine 10. For example, in one embodiment, the control logic of the controller(s) 26, 38 may configured to pitch the rotor blades 22 in order to satisfy a predetermined speed ramp-down rate, with the asymmetric loading inputs being used to override such control when the loading is equal to or exceeds the asymmetric loading threshold 132.

It should also be appreciated that the present subject matter is also directed to a system for stopping the operation of a wind turbine 10. The system may include a sensor 48, 50 configured to monitor at least one operating condition of the wind turbine 10 and a controller 26, 38 communicatively coupled to the sensor 48, 50. The controller 26, 38 may be configured to analyze the operating condition(s) to determine when a wind turbine stop event has occurred. In addition, the controller 26, 38 may be configured to implement a first stopping procedure in order to stop operation of the wind turbine 10 when it is determined that a pitch system failure has occurred and a second stopping procedure in order to stop operation of the wind turbine 10 when it is determined that a different wind turbine stop event has occurred.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for stopping the operation of a wind turbine, the wind turbine a plurality of rotor blades, the method comprising:
    receiving signals associated with at least one operating condition of the wind turbine;
    analyzing the at least one operating condition with a controller of the wind turbine; and
    implementing one of a first stopping procedure or a second stopping procedure in order to stop operation of the wind turbine when analysis of the at least one operating condition indicates that a wind turbine stop event has occurred, wherein implementing one of the first stoning procedure or the second stopping procedure comprises:
        when the wind turbine stop event corresponds to a pitch system failure, implementing the first stopping procedure by pitching each of the plurality of rotor blades having an operational pitch system from a current position of each rotor blade defined when the wind turbine stop event is detected towards a feather position at a first pitch rate; and
        when the wind turbine stop event corresponds to a stop vent that differs from a pitch system failure, implementing the second stopping procedure by simultaneously pitching each of the plurality of rotor blades from the current position of each rotor blade defined when the wind turbine stop event is detected towards the feather position at a second pitch rate, the first pitch rate differing from the second pitch rate.

2. The method of claim 1, wherein receiving signals associated with at least one operating condition of the wind turbine comprises receiving signals associated with a loading condition of the wind turbine, the loading condition corresponding to asymmetric loading of the wind turbine.

3. The method of claim 2, wherein analyzing the at least one operating condition with the controller of the wind turbine comprises comparing the asymmetric loading of the wind turbine to a predetermined asymmetric loading threshold.

4. The method of claim 3, wherein implementing the first stopping procedure comprises implementing the first stopping procedure when the asymmetric loading of the wind turbine is equal to or exceeds the predetermined asymmetric loading threshold.

5. The method of claim 4, further comprising:
    continuously monitoring the asymmetric loading of the wind turbine; and
    adjusting a magnitude of the first pitch rate based on variations in the asymmetric loading.

6. The method of claim 1, wherein the first pitch rate is varied between a high pitch rate and a low pitch rate during implementation of the first stopping procedure, the high pitch rate ranging from about 3°/s to about 7°/s and the low pitch rate ranging from about 0.5°/s to about 5°/s.

7. The method of claim 1, wherein the second pitch rate is varied between a high pitch rate and a low pitch rate during implementation of the second stopping procedure, the high pitch rate ranging from about 5°/s to about 9°/s and the low pitch rate ranging from about 0.5°/s to about 5°/s.

8. The method of claim 1, wherein the first and second pitch rates are maintained constant during implementation of the first and second stopping procedures.

9. A system for stopping the operation of a wind turbine, the wind turbine comprising a plurality of rotor blades, the system comprising:

a sensor configured to monitor at least one operating condition of the wind turbine; and a controller communicatively coupled to the sensor, the controller being configured to analyze the at least one operating condition to determine when a wind turbine stop event has occurred, the controller being further configured to implement a first stopping procedure in order to stop operation of the wind turbine when it is determined that a pitch system failure has occurred and a second stopping procedure in order to stop operation of the wind turbine when it is determined that a different wind turbine stop event has occurred, wherein the controller is configured to implement the first stopping procedure by pitching each of the plurality of rotor blades having an operational pitch system from a current position of each rotor blade defined when the wind turbine stop event is detected towards a feather position at a first pitch rate, wherein the controller is configured to implement the second stopping procedure by simultaneously pitching each of the plurality of rotor blades from the current position of each rotor blade defined when the wind turbine stop vent is detected towards the feather position at a second pitch rate, the first pitch rate differing from the second pitch rate.

10. The system of claim 9, wherein the at least one operating condition comprises asymmetric loading of the wind turbine.

11. The system of claim 10, wherein the controller is configured to compare the asymmetric loading of the wind turbine to a predetermined asymmetric loading threshold.

12. The system of claim 11, wherein the controller is configured to implement the first stopping procedure when the asymmetric loading of the wind turbine is equal to or exceeds the predetermined asymmetric loading threshold.

13. The system of claim 12, wherein the controller is configured to continuously monitor the asymmetric loading of the wind turbine and adjust a magnitude of the first pitch rate based on variations in the asymmetric loading.

14. The system of claim 9, further comprising a pitch adjustment mechanism, the controller being configured to transmit pitch commands to the pitch adjustment mechanism in order to implement the first and second stopping procedures.

15. The system of claim 9, wherein the first pitch rate is varied between a high pitch rate and a low pitch rate during implementation of the first stopping procedure, the high pitch rate ranging from about 3°/s to about 7°/s and the low pitch rate ranging from about 0.5°/s to about 5°/s.

16. The system of claim 9, wherein the second pitch rate is varied between a high pitch rate and a low pitch rate during implementation of the second stopping procedure, the high pitch rate ranging from about 5°/s to about 9°/s and the low pitch rate ranging from about 0.5°/s to about 5°/s.

17. The system of claim 9, wherein the first and second pitch rates are maintained constant during implementation of the first and second stopping procedures.

* * * * *

UNITED STATES PATENT AND TRADEMARK OFFICE
CERTIFICATE OF CORRECTION

PATENT NO. : 9,726,147 B2
APPLICATION NO. : 14/381687
DATED : August 8, 2017
INVENTOR(S) : Xiongzhe Huang Page 1 of 1

It is certified that error appears in the above-identified patent and that said Letters Patent is hereby corrected as shown below:

In the Claims

Claim 1: In Column 12, Line 3 - "turbine a" should read "turbine comprising a";

Claim 1: In Column 12, Line 14 - "first stoning" should read "first stopping";

Claim 1: In Column 12, Line 25 - "vent that" should read "event that";

Claim 9: In Column 13, Line 24 - "stop vent" should read "stop event".

Signed and Sealed this
Twenty-fifth Day of September, 2018

Andrei Iancu
*Director of the United States Patent and Trademark Office*